(12) United States Patent
Tsai et al.

(10) Patent No.: US 7,142,865 B2
(45) Date of Patent: Nov. 28, 2006

(54) TRANSMIT POWER CONTROL BASED ON VIRTUAL DECODING

(75) Inventors: Shiau-He Shawn Tsai, San Diego, CA (US); Farideh Khaleghi, San Diego, CA (US); Patrik Nils Lundqvist, Encinitas, CA (US)

(73) Assignee: Telefonaktie Bolaget LM Ericsson (publ) (SE)

( * ) Notice: Subject to any disclaimer, the term of this patent is extended or adjusted under 35 U.S.C. 154(b) by 480 days.

(21) Appl. No.: 10/161,143

(22) Filed: May 31, 2002

(65) Prior Publication Data

US 2003/0224836 A1   Dec. 4, 2003

(51) Int. Cl.
*H04B 7/185* (2006.01)
*H04Q 7/00* (2006.01)
*H04Q 7/20* (2006.01)

(52) U.S. Cl. .............. 455/452.1; 455/452.2; 455/453; 370/318; 370/329; 370/332; 370/333

(58) Field of Classification Search ............. 455/522, 455/67.1, 423, 452.1, 572, 573; 370/318, 370/252, 320, 335, 332, 209, 216, 342
See application file for complete search history.

(56) References Cited

U.S. PATENT DOCUMENTS

| | | | |
|---|---|---|---|
| 6,084,904 A * | 7/2000 | Wang et al. ............. 375/130 |
| 6,298,242 B1 * | 10/2001 | Schiff ..................... 455/522 |
| 6,304,563 B1 | 10/2001 | Blessesnt et al. |
| 6,366,778 B1 | 4/2002 | Bender et al. |
| 6,415,137 B1 * | 7/2002 | Hayashi .................. 455/70 |
| 6,526,031 B1 * | 2/2003 | Zaff et al. ................ 370/335 |
| 6,539,205 B1 * | 3/2003 | Wan et al. ............... 370/465 |
| 6,587,447 B1 * | 7/2003 | Wang et al. ............. 370/335 |
| 6,590,874 B1 * | 7/2003 | Wang et al. ............. 370/318 |
| 6,768,727 B1 * | 7/2004 | Sourour et al. .......... 370/335 |
| 6,771,700 B1 * | 8/2004 | Razoumov et al. ...... 375/227 |

(Continued)

FOREIGN PATENT DOCUMENTS

WO   WO 0152440   7/2001

OTHER PUBLICATIONS

Martti Moisio, Capacity Gains of Single Antenna Interrence Cancellation in GSM.*

(Continued)

*Primary Examiner*—Joseph Feild
*Assistant Examiner*—Julio Perez
(74) *Attorney, Agent, or Firm*—Coats & Bennett, P.L.L.C.

(57) ABSTRACT

A wireless receiver, such as in a mobile station or base station within a wireless communication network, estimates the frame error rate (FER) for one channel using signal information received on another, associated channel. As such, FER estimates may be generated for a channel of interest during discontinuous periods of that channel, or where the duty cycle of the channel is too low to support a desired FER estimation rate. Signal information received on the associated channel is manipulated as needed to conform to the format of the channel of interest, such as the encoding format, and then decoded as if it had been received on the channel of interest. Thus, the signal information is treated as virtually encoded data for the channel of interest, and may comprise essentially any type of signal that is known or determinable, such as a pilot, synchronization, traffic, or control channel.

45 Claims, 12 Drawing Sheets

U.S. PATENT DOCUMENTS

| | | |
|---|---|---|
| 2002/0003785 A1 | 1/2002 | Agin |
| 2002/0147025 A1* | 10/2002 | Savas ......................... 455/522 |
| 2002/0168982 A1* | 11/2002 | Sorokine et al. ............ 455/442 |
| 2003/0224836 A1* | 12/2003 | Tsai et al. .................... 455/573 |
| 2004/0048619 A1* | 3/2004 | Kim et al. ................ 455/452.1 |
| 2004/0203782 A1* | 10/2004 | Peng et al. .................. 455/436 |
| 2005/0197150 A1* | 9/2005 | Sarkar et al. ................ 455/522 |

OTHER PUBLICATIONS

Lodewijk T. Smit, BER Estimation for wireless links using BSPK/QPSK modulation.*

Ericsson, FER, RXQUAL, and DTX DL Rate Measurements in TEMS investigation GSM.*

* cited by examiner

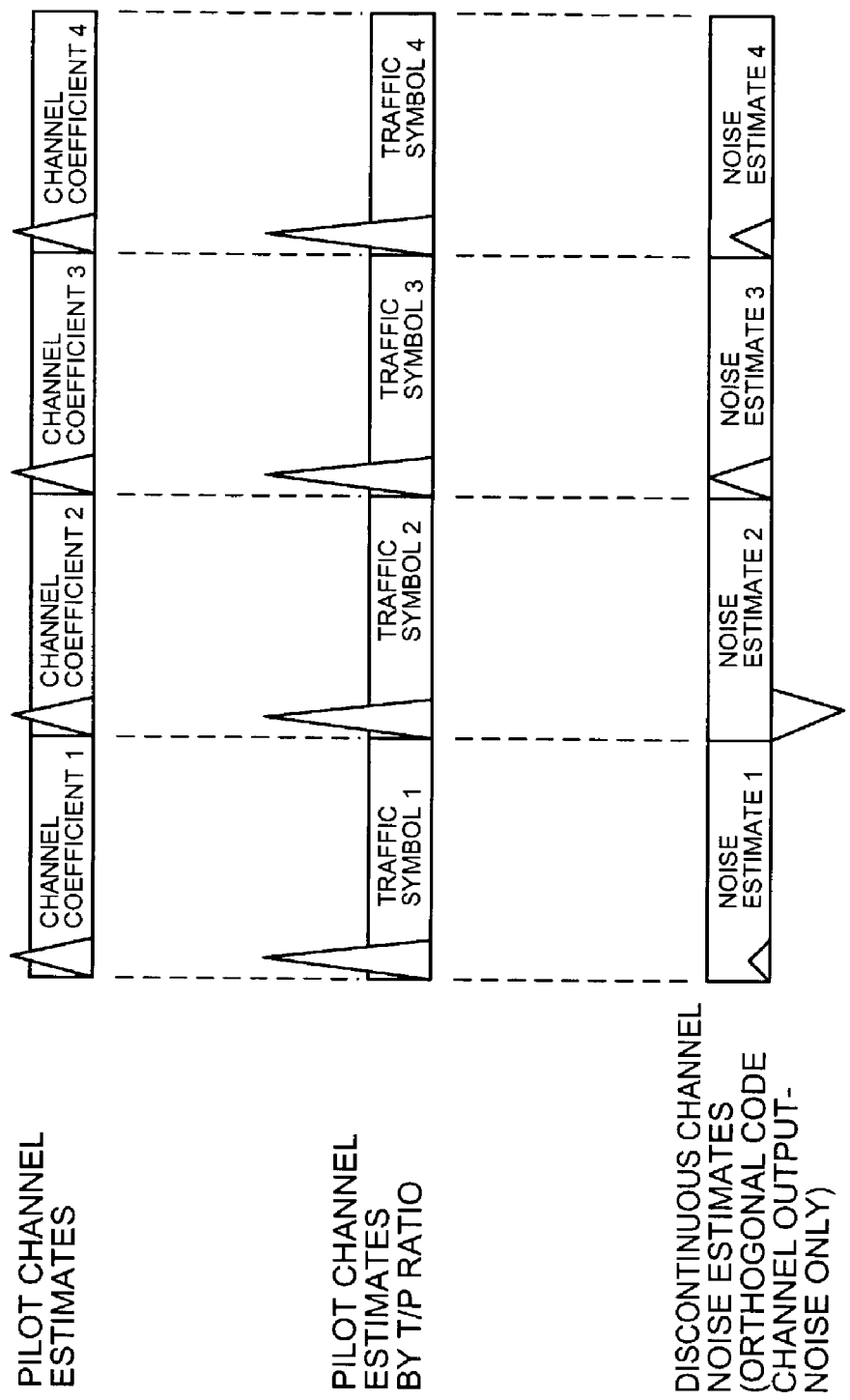

TRANSMIT POWER CONTROL BASED ON VIRTUAL DECODING

BACKGROUND OF THE INVENTION

The present invention generally relates to outer-loop power control in wireless communication systems, and particularly relates to power control based on inferring a Frame Error Rate (FER) for a first channel of interest based on a signal received through an associated second channel.

Transmitter power control is an integral part of many wireless communication systems, including wireless communication networks based on Code Division Multiple Access (CDMA). Examples of CDMA-based network standards include, but are not limited to, IS-95, IS-2000 (cdma2000), and Wideband CDMA (WCDMA). In such systems, overall network capacity requires that transmitting mobile stations and network base stations constrain their transmit powers essentially to the minimum power levels necessary for reliable communication.

A typical approach to transmitter power control adopts both "inner-loop" and "outer-loop" power controls. In the inner-loop portion of such approaches, a first radio transceiver controls the transmit power of a second radio transceiver up or down such that it receives a signal of interest transmitted from the second radio transceiver at a target received signal quality. In turn, the slower, outer-loop portion of the power control scheme adjusts the inner-loop target up or down based on an observed quality metric, which is generally a frame error rate (FER) computed based on received data errors.

Transmit power control as described above relies on the presence of a suitable channel on which to base power control decisions. That is, conventional power control is based on either a fundamental channel carrying data traffic, or a dedicated control channel carrying control and other signaling information. In either instance, the channel of interest includes encoded data that may be decoded and evaluated for received data errors. It is this received data error evaluation that provides the basis for making intelligent decisions about whether to adjust the target received signal quality either up or down as part of the outer-loop power control mechanism.

In contrast to certain types of calls such as voice calls, packet data calls may be sent using discontinuous transmissions (DTX). That is, the traffic channel(s) used to carry packet data between a wireless network and a mobile station may be intermittently inactive. Without the presence of continuously received data frames on either a traffic channel or a dedicated control channel, the conventional approach to outer-loop power control becomes problematic as the basis for making adjustments to the target received signal quality is only intermittently available. One current approach to outer-loop power control during DTX is to gradually increase the inner-loop target during DTX periods, but this approach often results in greater than needed transmit power at the end of a DTX period, and particularly so at the end of longer DTX periods.

BRIEF SUMMARY OF THE INVENTION

The present invention relates to a method and apparatus for estimating Frame Error Rate (FER) for a channel of interest that is discontinuous or has a low duty cycle by using known or determinable signal information obtained on an associated channel that is continuous or has a high duty cycle. Thus, a transceiver according to the present invention infers FER estimates for the channel of interest even where signal information is not continuously received on that channel by processing signal information received through the associated channel, where such signal information is known a priori or is determinable a posteriori. Such operation is particularly useful, for example, in maintaining FER-based transmit power control on a discontinuously transmitted (DTX) traffic or control channel.

In an exemplary embodiment, the transceiver passes the signal information received on a first channel associated with the channel of interest through a decoder that is otherwise used for the channel of interest's signal information, or through a decoder that is equivalent to such a decoder. That is, the transceiver processes or otherwise maps the known received signal information into a virtually encoded form that is compatible with the decoder used for the channel of interest. Processing or mapping the signal information may involve compensating the signal information for frame length and/or transmit power differences, and may involve noise estimation. Then, based on its knowledge of the virtually encoded values, the transceiver evaluates the decoded data output from the decoder to determine an FER estimate for the first channel. By employing the decoding process used for the channel of interest, the estimated FER more closely approximates the FER that would be observed in first channel signal information if it were available.

The extent of processing required for formatting the received signal information for input to the decoder depends upon the nature of the associated first channel. For example, the first channel might be a pilot channel, such as the pilot channel used in IS-95 or IS-2000 wireless networks. In this instance, the received signal information generally comprises an unmodulated, known symbol waveform that may be imagined as corresponding to a virtually encoded all-zeros codeword. Processing the pilot waveform may involve compensation for frame length and/or transmit power differences, and may involve noise estimation, but at least comprises passing the pilot symbols through the first channel's decoder and evaluating the decoded data for correspondence with the imagined all-zeros codeword.

In other scenarios, the first channel might comprise a synchronization channel, such as the primary or secondary "sync" channels used in Wideband CDMA (WCDMA) wireless networks. Typically, such sync signals comprise a series of transmitted symbols having some characteristic symbol polarity pattern known to the transceiver. As such, transceiver processing generally comprises changing or otherwise adjusting the received symbol polarities such that the received signal information conforms to the code set of the decoder. In an exemplary embodiment, the transceiver maps the received symbols into an all-zero code word for input to the decoder similar to the above virtually encoded all-zero codewords associated with the received pilot signal.

In still other scenarios, the first channel might comprise an encoded channel, such as one carrying a traffic or control signal transmitted in association with the signal information received on the first channel. Here, the received signal information is not known a priori as with received pilot/sync signal, but is determinable a posterior based on Cyclic Redundancy Check (CRC) or other error coding included in the received signal information. That is, the transceiver decodes the received signal information using a decoder intended for the channel of interest, determines the actual received signal information, and then processes a copy of received signal for decoding as if it was received on the channel of interest. Again, the transceiver might map the received symbols into the all-zero code word, or might adopt another mapping scheme that conforms to the decoder's code set.

Thus, the present invention provides generalized virtual decoding of information received on the first channel using the decoding process associated with the channel of interest, such that an FER estimate may be inferred for the channel of interest using signal information received on the first channel. As used herein, the channel of interest may be referred to as "discontinuous" channel but it should be understood that such terminology broadly refers to any communication channel that employs discontinuous transmission or low duty cycle transmission such that signal information is not received through that channel at a rate supporting a desired FER estimation update rate.

Similarly, the first channel may be referred to as a "continuous" channel but it should be understood that such terminology broadly refers to any communication channel that provides a continuous signal or relatively high duty cycle signal. In general, the first channel should provide signal information at a rate supporting a desired FER estimation update rate.

As such, the present invention may be advantageously applied to FER-based transmit power control in a wireless communication network, and may be used for forward or reverse link power control. In either case, the inner-loop received signal quality target used in power control of a discontinuous channel may be adjusted using an inferred FER estimate obtained by decoding signal information received on an associated continuous channel, e.g., pilot, sync, traffic, or control channel. That is, the inner loop power control target used to determine whether a remote transmitter should increase or decrease its transmit power for the discontinuous channel may be adjusted based on the FER inferred from the continuous channel. As such, the present invention finds broad applicability across a range of wireless communication network types, including those based on IS-95, IS-2000, and WCDMA standards.

BRIEF DESCRIPTION OF THE DRAWINGS

FIG. 9 is a diagram of alternate exemplary signal compensation for a pilot or other known signal in support of FER inference.

DETAILED DESCRIPTION OF THE INVENTION

The present invention is applicable in wireless communication networks where Frame Error Rate (FER) estimates are desired for a given communication channel of interest but signal information received through that channel is available discontinuously or at a duty cycle too low to support a desired FER estimation rate. The generalized approach embodied in the present invention comprises using signal information received through an associated channel to infer the FER of the channel of interest. The signal information received on the associated channel, referred to a first channel, is received either continuously or at a high enough duty cycle to support the desired FER estimation rate.

Thus, signal information received on the first channel is used to estimate the FER that would be expected for data received on the channel of interest. In the context of this discussion, an "associated" channel is a channel that is transmitted in conjunction with the channel of interest, e.g., transmitted by the same radio transmitter that transmits the channel of interest, such that a signal received on the associated channel may be manipulated to serve as a surrogate or substitute for a signal received on the channel of interest.

The various embodiments of the present invention accommodate a range of wireless communication network types. As such, the present invention finds applicability in wireless networks based on Time Division Multiple Access (TDMA) techniques, in wireless networks based on Code Division Multiple Access (CDMA) techniques, and in hybrid networks that combine TDMA and CDMA techniques. Thus, the present invention is broadly applicable to a range of network types, such as TMDA-based IS-136 and GSM networks, and CDMA-based IS-95, IS-2000, and WCDMA networks.

Further, the present invention applies to FER estimation on the network-transmitted forward link, and on the mobile-transmitted reverse link. Thus, while exemplary embodiments discussed below may use nomenclature that is specific to a particular network architecture or air interface standard, those skilled in the art should recognize that the discussion implicitly includes analogous or like systems, entities, and functions in other network types and air interface standards.

Figure 1:
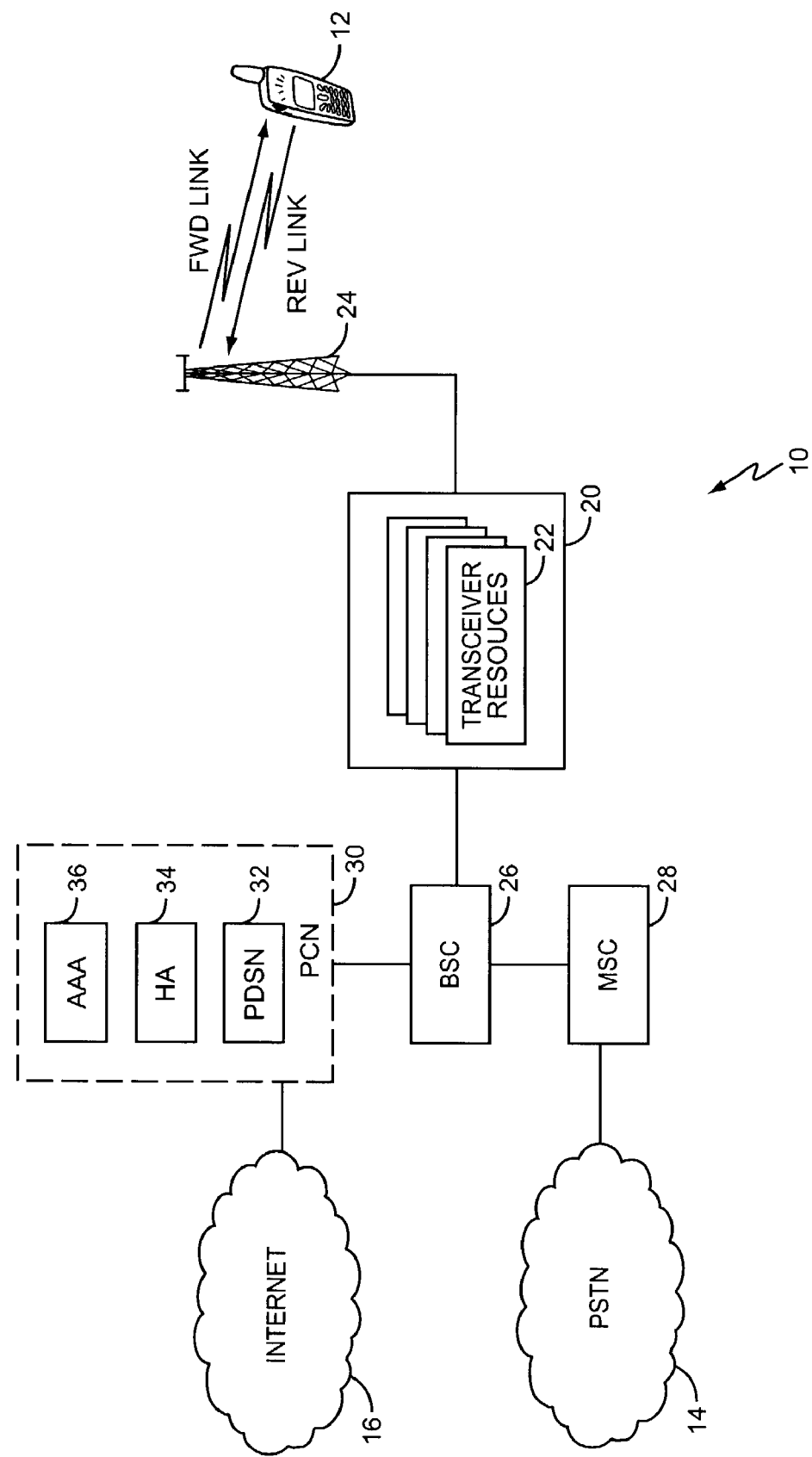
FIG. 1 is a diagram of an exemplary wireless communication network for practicing the present invention.

With the above in mind, FIG. 1 is a diagram of an exemplary wireless communication network 10. Network 10 communicatively couples mobile station (MS) 12 to the Public Switched Telephone Network (PSTN) 14 and the Internet 16, or other Public Data Network (PDN). In this exemplary embodiment, network 10 comprises a Base Station (BS) 20, including radio frequency (RF) transceiver resources 22, and an associated antenna 24, a Base Station Controller 26, a Mobile Switching Center (MSC) 28, and a Packet Core Network (PCN) 30, which comprises a Packet Data Serving Node (PDSN) 32, a Home Agent (HA) 34, and an Authentication, Authorization, and Accounting server (AAA) 36. It should be noted that, as illustrated, network 10 provides both packet-switched and circuit-switched services, but this combined functionality is not necessary for practicing the present invention.

In operation, MSC 28 generally manages the setup and routing of circuit-switched voice and data calls between the PSTN 14 and MS 12, while the PDSN 32 generally manages packet data calls between the Internet 16 and MS 12. In either case, the BSC 26 routes radio traffic to and from the BS 20. In turn, the RF transceiver resources 22 in BS 20 support the transmission of traffic and control signaling to the MS 12 on one or more forward link channels, as well as the reception of traffic and control signaling from the MS 12 on one or more reverse link channels.

Network 10 typically employs transmit power control on one or both of the forward and reverse links. That is, the transmit power from BS 20 to MS 12 and/or the transmit power from MS 12 to BS 20 is usually limited to avoid transmitting with excessive power. Such power control is widely practiced in interference-limited wireless communication networks, such as CMDA-based networks. For forward link power control, the MS 12 transmits power control commands to the network 10 on the reverse link, such that the MS 12 receives the forward link signal of interest at a desired received signal quality, where received quality is often based on a target received signal-to-noise ratio (target SNR). In a similar power control technique for the reverse link, the network 10 transmits power control commands to the MS 12 on the forward link to control the mobile's transmit power such that network 10 receives the reverse link signal of interest at a desired signal quality.

In general, the above approach to power control involves both inner- and outer-loop power controls. With such an approach, a first transceiver, e.g., BS 20, or MS 12 receives a signal of interest from a second transceiver and commands the second transceiver to increase or decrease its transmit power based on whether the first transceiver receives the signal of interest above or below a target received signal quality. Commonly, the targeted received signal quality is expressed as a target signal-to-noise ratio (SNR). Generation of the up/down power commands based on evaluating the received signal quality is referred to as "inner-loop" power control, while adjustment of the inner-loop target signal quality is referred to as "outer-loop" power control.

The above inner/outer loop power control scheme applied to a continuously transmitted traffic or control channel typically involves receiving the signal, decoding the received signal to recover encoded data frames from it, and evaluating the decoded data to identify received data errors. Signals received through traffic and/or control channels generally are error-encoded such that transmitted information can be verified at the receiving end. Such error coding typically involves the use of convolutional coding, "turbo" coding, and/or block coding, such as with Cyclic Redundancy Check (CRC) values. Detected errors in the received data then serve as a basis for estimating a Frame Error Rate (FER) for the received signal.

Commonly, the outer-loop power control mechanism, whether at the MS 12 or at the BS 26, adjusts the inner-loop target signal quality upward if the estimated FER exceeds a defined threshold, and adjusts the inner-loop target signal quality downward if the estimated FER falls below the defined threshold. Thus, transmit power at the remote transceiver is maintained essentially at the minimum transmit power necessary to achieve a desired FER for the transmitted data.

The above approach to outer loop power control does not work well where the received channel of interest is discontinuous or otherwise has a low duty cycle, as signal information may not be available at a given instant, or may not be available at a high enough duty cycle to support timely FER estimation. In accordance with the present invention, signal information received through a first channel is used as a substitute or surrogate for signal information received through a second channel, where the second channel represents the channel of interest in terms of FER estimation. That is, signal received on the first channel is manipulated as needed such that it approximates a signal received on the second channel, and is then used as the basis for inferring FER estimates for the second channel.

As an example, the first channel might comprise a forward link pilot or synchronization channel carrying a pilot or synchronization signal transmitted from network 10 to MS 12, while the second channel might comprise a discontinuous traffic or control channel. Alternatively, the first and second channels might comprise reverse link channels carrying signals transmitted by the MS 12 to network 10. In general, whether transmitted on the forward or reverse links, the signal received on the first channel comprises any signal that can be used as a surrogate for signals received on the second channel with regard to FER estimation for the second channel.

Figure 2:
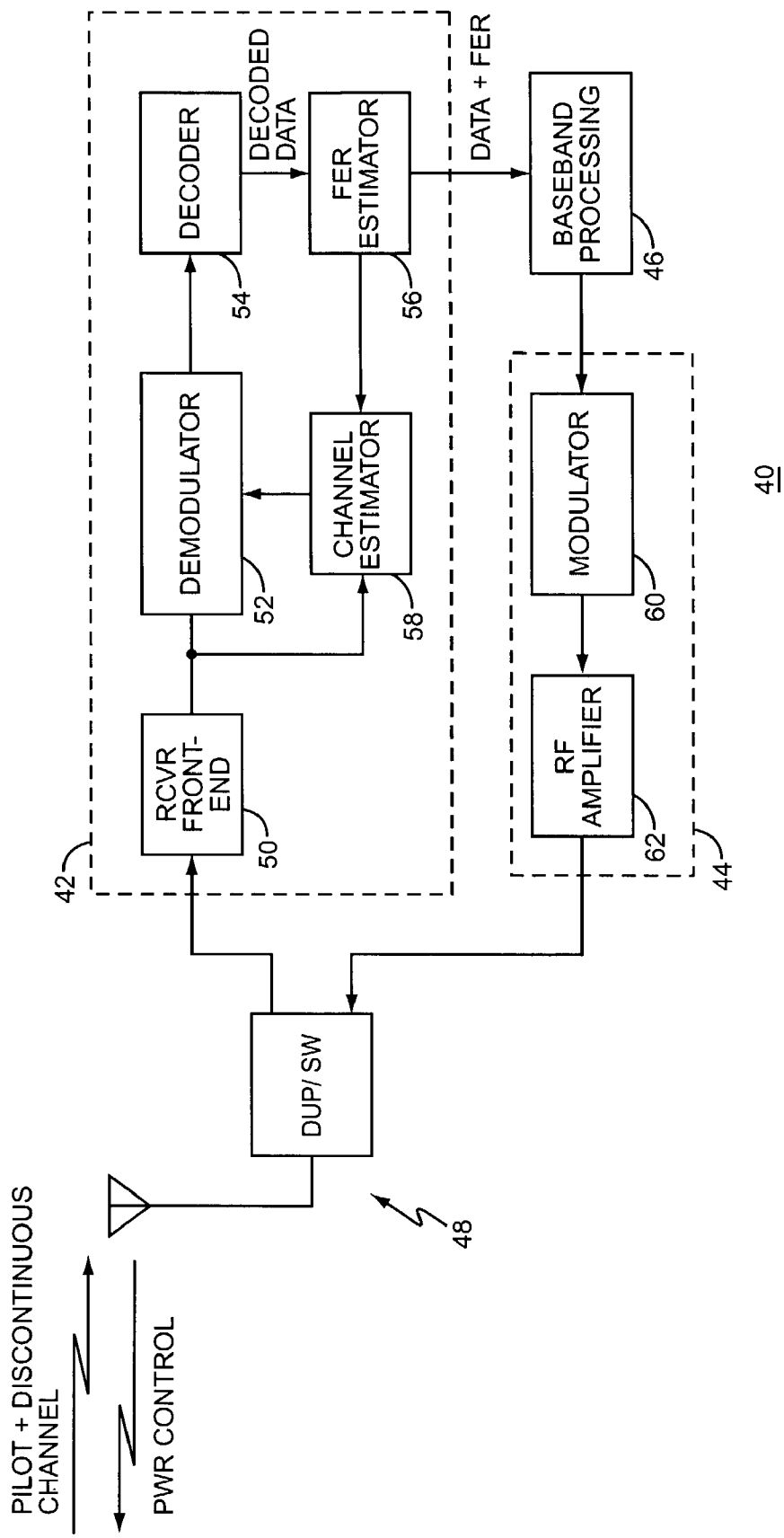
FIG. 2 is a diagram of an exemplary transceiver entity for use in the network of FIG. 1.

FIG. 2 is an exemplary diagram of a transceiver 40, and generically represents transceiver resources as might be implemented in either or both the BS 20 and the MS 12. In this exemplary embodiment, transceiver 40 comprises a receiver 42, a transmitter 44, a baseband processor 46, and antenna assembly 48, which might include BS antenna 24 if transceiver 40 is implemented as part of transceiver resources 22 at BS 20.

Receiver 42 comprises a receiver front-end 50 to receive remotely transmitted signals, such as the first signal on the first channel and the signal of interest on the channel of interest. Regardless, front-end 50 generally provides filtering, amplification, digitization, and, optionally, downsampling. The digitized received signal(s) output from front-end 50 pass to demodulator 52, which demodulates received symbol information to obtain data bits for decoding by decoder 54. Decoder 54 may operate to remove both channel and error encoding from the received data where such data has been encoded. The decoded data from decoder 54 passes to FER estimator 56, which in this embodiment evaluates the decoded data to identify errors. Decoded data and FER estimates from FER estimator 56 pass to baseband processor 46 for further action as is detailed later herein.

Transmitter 44 comprises modulator 60 and RF amplifier 62, which may comprise one or more amplification stages such as a pre-amplifier preceding a RF power amplifier. In any case, baseband data from the baseband processor 46 modulates an RF carrier, possibly in quadrature, and the modulated carrier then passes to amplifier 62 for power amplification such that it is suitable for transmission by antenna assembly 68.

In operation, transceiver 40 receives signals on first and second associated channels. Transceiver 40 uses a signal received on the first channel as a basis for estimating the FER of the second channel. As noted earlier, the received signal used as the basis for FER estimation serves a surrogate for signals on the channel of interest, and might comprise a pilot signal, a synchronization signal, or essentially any other type of signal that is known at transceiver 40. That is, the received signal to be used for FER estimation is known a priori or is determinable a posterior at the transceiver 40.

Figure 3:
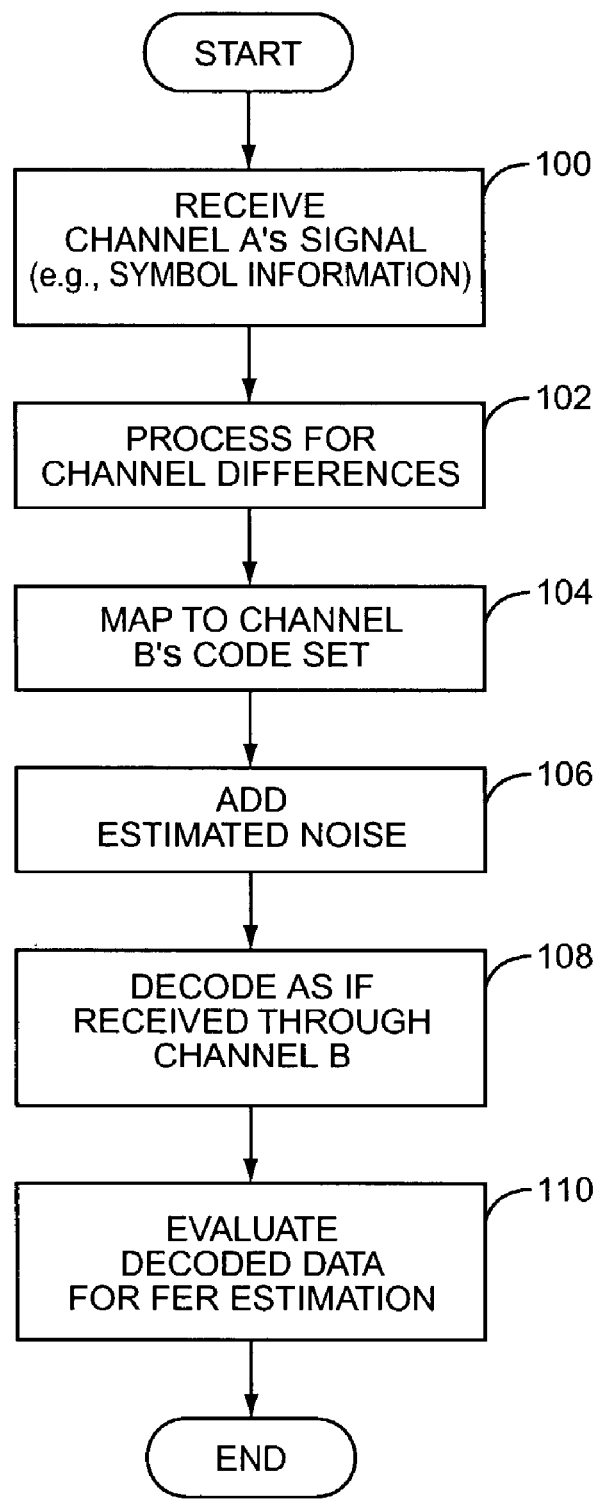
FIG. 3 is a diagram of exemplary processing logic for inferring the FER of one channel based on a known or determinable signal received on an associated channel.

FIG. 3 illustrates exemplary processing logic for the general approach to FER estimation in accordance with the present invention. Transceiver 40 receives Channel A's signal, which generally comprises receiving one or more transmitted symbols (Step 100). Depending upon the differences between Channels A and B, where Channel B is the channel of interest, transceiver 40 may process the received signal to compensate for channel differences (Step 102). That is, transceiver 40 may compensate the signal received through Channel A to make it look more like it was received through Channel B. Such compensation is explained in more detail later herein, but as an example, the SNR of the received signal may be adjusted for Channel A/B differences including, but not limited to, one or more of transmit power differences, coding differences, SNR differences, symbols-per-frame differences, etc.

Further, transceiver 40 may, depending upon the nature of the received signal, adjust or "map" the received signal such that it conforms to the coding convention of Channel B. That is, signals received through Channel B may have different applied encoding than those received through Channel A. Thus, Channel A's signal may require mapping into the code set used for decoding signals received on Channel B.

Regardless of the specific processing/mapping details, the transceiver 40, in an exemplary embodiment, adds noise estimates to the received signal (Step 106), and decodes the received signal as if it had been received on the channel of interest, e.g., it decodes Channel A's signal as if it had been received on Channel B (Step 108). Transceiver 40 then evaluates the resultant decoded data for errors, which errors are used as the basis for inferring an estimated FER of Channel B. Note that data errors in this context are decoded output values that deviate from the expected values based on the transceiver's knowledge of the signal being decoded.

Figure 4:
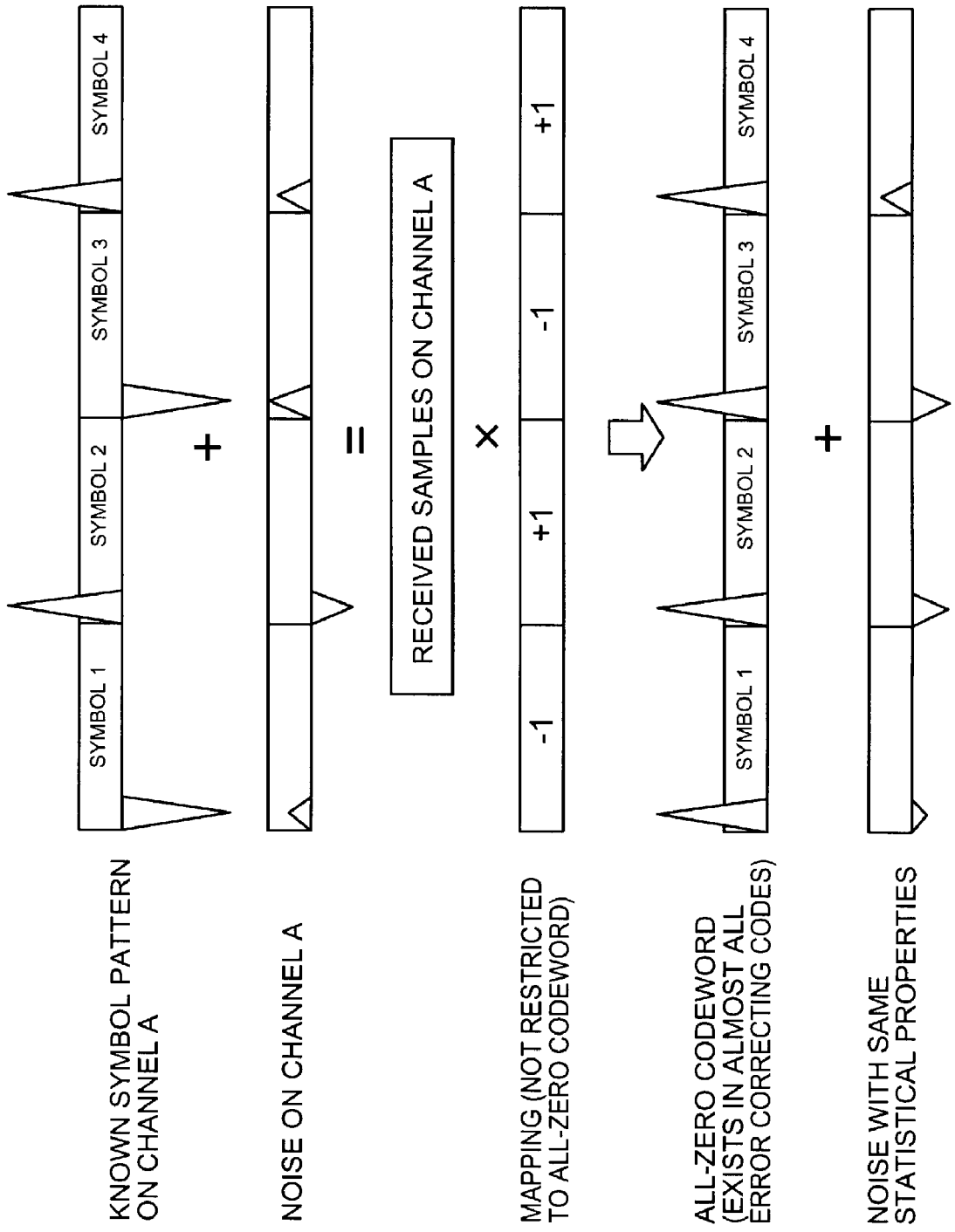
FIG. 4 is a diagram illustrating application of the logic of FIG. 3 to received signal samples.

FIG. 4 is a diagram of the above general process, and illustrates receiving symbols in a Channel A signal, and then processing/mapping those received symbols in preparation for decoding them as if they were received on Channel B. First, the known or determinable symbol pattern is received in combination with noise on Channel A. The combined symbols plus noise may be considered as received samples. Note that FIG. 4 does not explicitly show SNR or frame length compensation, it should be understood that the received samples might be compensated for such differences.

In any case, the received samples are, if necessary, transformed or otherwise mapped into the code set associated with Channel B, such that the decoding normally used for Channel B can be applied to the received samples. In a simplistic example, a received sample set consisting of alternating polarity symbols might be selectively multiplied by −1's to generate a fixed polarity sample set that corresponds to an all-zero codeword for Channel B's code set.

Once any required mapping is performed, the received samples are, in an exemplary embodiment, combined with corresponding noise estimates, and then decoded according to Channel B's decoding. By adding in noise, transceiver 40 more closely approximates the actual FER that would be expected for a signal received on Channel B. In this sense, transceiver generally adds noise estimates having the same or similar statistical properties as the actual received noise.

The above discussion pointed out that the signal used as a basis for estimating FER was known or determinable. Thus, the received signal might comprise an error-encoded signal, e.g., traffic or control, which can be decoded and checked for errors. With the decoded content of the received signal known, transceiver 40 can treat the received symbols from which the decoded data was known as a known symbol set. As such, transceiver 40 may receive an error-encoded signal on the first channel as a sequence of received symbol values, and decode the received symbols using the demodulation/decoding processes normally associated with that first channel. The decoded data is then checked for errors, and the received data is identified.

Decoding the data provides transceiver 40 with a basis for knowing the value of each received symbol, such that transceiver 40 can then form the surrogate signal based on mapping a copy of the received signal sequence into the code set or code domain of the channel of interest. With this re-mapping, the received symbol sequence is then decoded as if it had been received on the channel of interest rather than on the first channel. The FER for the channel of interest is then inferred from observed errors in the decode data. In a sense, the process just described amounts to manipulating the received signal to form the surrogate signal as virtual data frames that conform to the encoding scheme applied to signals ordinarily transmitted on the channel of interest.

The above process is somewhat simplified where the received signal is not an encoded data signal, such as where the received signal is a pilot or synchronization comprising a known sequence of symbols. For example, the pilot signal in an IS-2000 wireless network comprises an unmodulated spreading waveform that may be thought of as an all-zeros encoded waveform. Similarly, synchronization signals, such as those used in WCDMA systems, comprise known symbol patterns or sequences. Thus, the signal received on the first channel may be used for inferring the FER of data received on an associated traffic or control channel even though the received signal carries no real data.

In performing such estimation, transceiver 40 treats the received signal as a "virtually encoded" data signal. Using an unmodulated pilot signal as an example, transceiver 40 treats the pilot signal as an all-zeros or all-ones signal. On this basis, the pilot signal represents known symbol information from the perspective of transceiver 40. Thus, transceiver 40 essentially can "pretend" that the pilot signal represents virtually encoded data and pass the received pilot signal information, e.g., the received pilot symbols, through a decoding process that is used for the channel of interest, or is equivalent to the decoding process used for signals received on the channel of interest.

Because transceiver 40 has a priori knowledge of the pilot signal, it knows what output data to expect from decoding the pilot signal, and can therefore treat errors in the decoded output as received data errors for FER estimation. That is, errors in the decoded output obtained from the pilot symbol are equivalent to data errors that might be observed in encoded data received on the channel of interest. Essentially the same virtual decoding idea applies to WCDMA synchronization signals, and other types of known signals, such as those signal that might be used in a TDMA-based wireless network.

Figure 5:
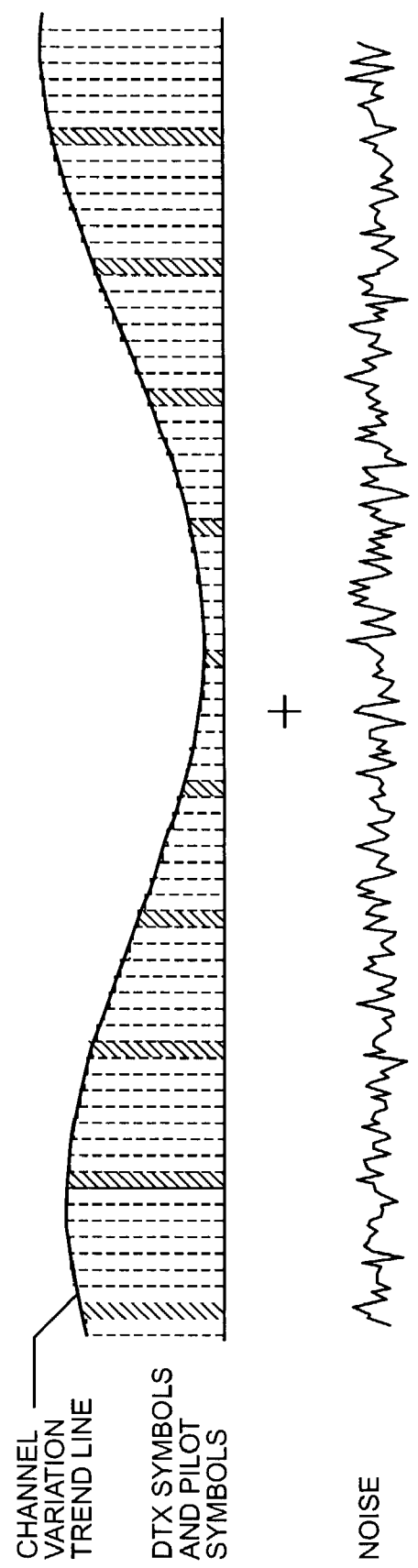
FIG. 5 is a diagram of a conventional encoder.

As an example of TDMA based processing, FIG. 5 illustrates Time-Division-Multiplexed (TDM) pilot symbols. In the graph, the dashed segments represent, for example, DTX traffic channel symbols, or, more, generally a signal of interest on a discontinuous channel. In turn, the hatched elements represent pilot symbols, or, more generally, represent a pilot signal or other known synchronization and/or channel estimation signal. The heavy line following the contour of the received pilot signal represents a channel variation that can be recovered to a certain accuracy using the pilot signal. Finally, the bottom-most waveform represents received noise.

Here, the TDM pilot signal is used to infer a FER estimate for the DTX channel. Transceiver 40 processes the pilot symbols such that they essentially mimic symbols that would be received on the DTX channel. Thus, if the DTX channel is a traffic channel, transceiver 40 processes the pilot symbols such that they represent "recovered" traffic symbols. In this sense, then, the processed pilot symbols represent surrogate traffic channel symbols appropriate for decoding using the decoding process normally applied to actual traffic channel symbols received on the DTX channel.

Further, the noise appearing during the DTX portions of the traffic channel may be added to these recovered traffic symbols. The noise+recovered symbols are then decoded as virtual data frames using the decoding process associated with the DTX traffic channel. Errors in the decoded output are treated as actual traffic channel errors, and provide a basis for estimating the FER of the DTX traffic channel. In other words, counting the decoding error of all-zeros is equivalent to counting the decoding error of other codewords that would actually be transmitted on the discontinuous traffic or control channel of interest.

Figure 6:
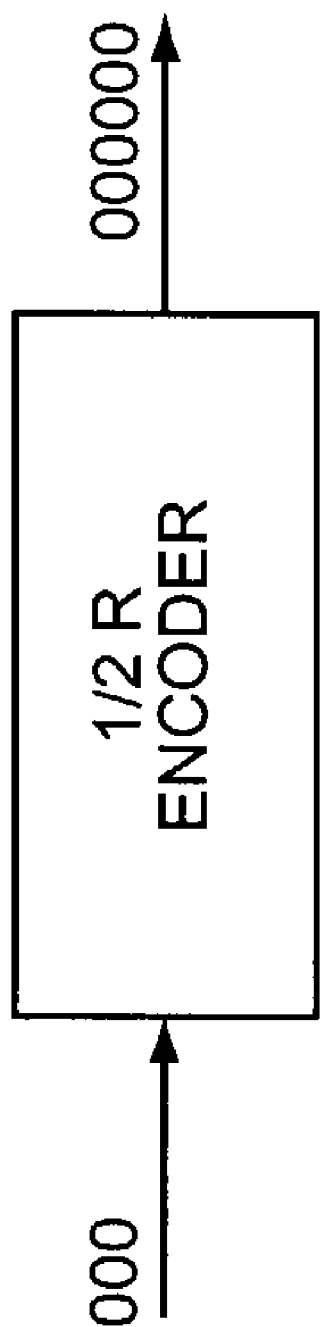
FIG. 6 is a diagram of exemplary FER estimation using a Time-Division-Multiplexed (TDM) signal as the basis for inferred FER estimation.

Because the above process involves treating the pilot signal as a "virtually encoded" data signal, FIG. 6 illustrates a conventional half-rate encoder that can be imagined as being applied to the pilot signal prior to transmission. Thus, if the pilot signal is imagined as an all-zeros input, the encoder generates an all-zeros output codeword. Since the decoding process applied to the received pilot signal by transceiver 40 represents the inverse of the imagined encoding process, decoding the all-zeros pilot codewords should result in all-zeros decoded data. Therefore, in this specific example, non-zero output from the pilot signal decoding process represents received data errors. Thus, in an exemplary embodiment, the transceiver 40 despreads or otherwise demodulates the pilot signal to obtain pilot symbols, and decodes the pilot symbols as "virtual data frames" using decoder 54 to obtain decoded data. FER estimator then generates an estimated FER based on identifying errors in the decoded data.

Figure 7:
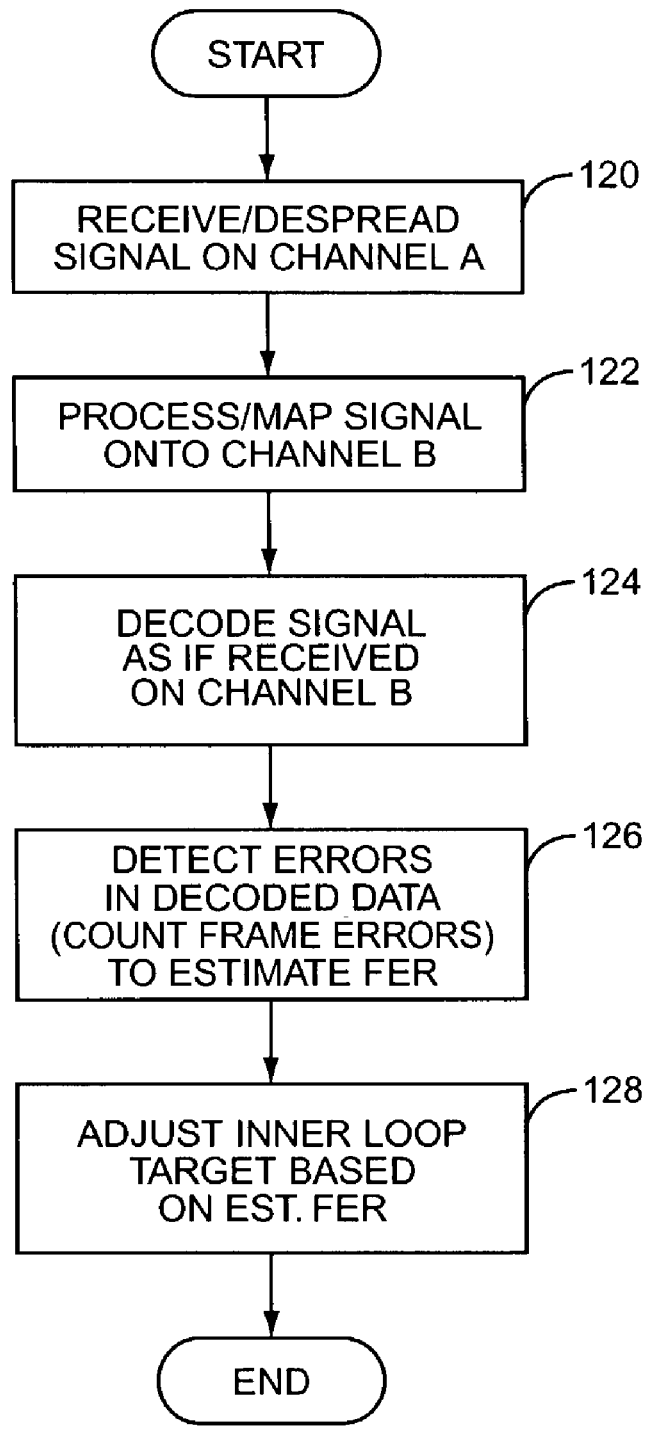
FIG. 7 is a diagram of exemplary processing logic for inferring FER from a pilot or other known signal.

FIG. 7 illustrates exemplary flow logic for pilot-based FER estimation. Processing begins with transceiver 40 receiving and despreading, or otherwise demodulating, a pilot signal transmitted on a pilot channel. Transceiver 40 also receives a signal of interest on a discontinuous channel associated with the pilot channel (Step 120). The channel estimator 58 of Transceiver 40 uses the received pilot signal to perform channel estimation (Step 122). Channel estimator 58 generates channel estimates characterizing the propagation channel(s) through which the pilot signal and signal of interest are received, which estimates may be used to improve received symbol demodulation.

Transceiver 40 then de-interleaves the received pilot symbols to undo any channel encoding, such as interleaving, applied at transmission and, if desired, compensates the pilot symbols obtained from the pilot signal for one or more differences between the pilot channel and the discontinuous channel (Step 124). Possible channel differences include differences between the transmitted power level on the pilot and the traffic channels and differences between the number of pilot symbols over one time slot as compared to the number of traffic or control symbols received over the same time slot, particularly where more than one code channel is used for the discontinuous channel. Compensation of the pilot symbols is particularly desirable where there are significant differences between the frame lengths and/or transmit powers of the pilot and discontinuous channels.

The pilot symbols are then decoded as virtual data frames as explained above (Step 126). That is, transceiver 40 decodes the pilot symbols as if they had been received on the discontinuous channel rather than the pilot channel. Such decoding involves passing the compensated/deinterleaved pilot symbols through decoder 54, and then evaluating the decoded data for discrepancies using FER estimator 56 (Step 128). In an exemplary embodiment, the estimated FER is passed to baseband processor 46 as a basis for that processor's adjustment of the inner loop target as part of transceiver 40's inner/outer-loop power control operations (Step 130).

Pilot symbol compensation, if performed by transceiver 40 as part of pilot-based FER estimation, generally attempts to make the FER estimates obtained for the pilot signal conform more closely to what would have been obtained based on evaluating the discontinuous channel directly. Thus, one general technique involves compensating the pilot symbols such that the SNR of the pilot signal equals or at least approaches that of the discontinuous channel.

Commonly, the discontinuous channel is, as noted, a discontinuous traffic or control channel that is transmitted at a defined power ratio as compared to the pilot signal. Thus, the discontinuous channel signal often is received at a higher signal level than the pilot signal. One approach to increasing the SNR of the pilot involves a spreading gain adjustment, wherein the symbol time of pilot symbols is adjusted to increase the effective SNR of the pilot signal.

Figure 8A:
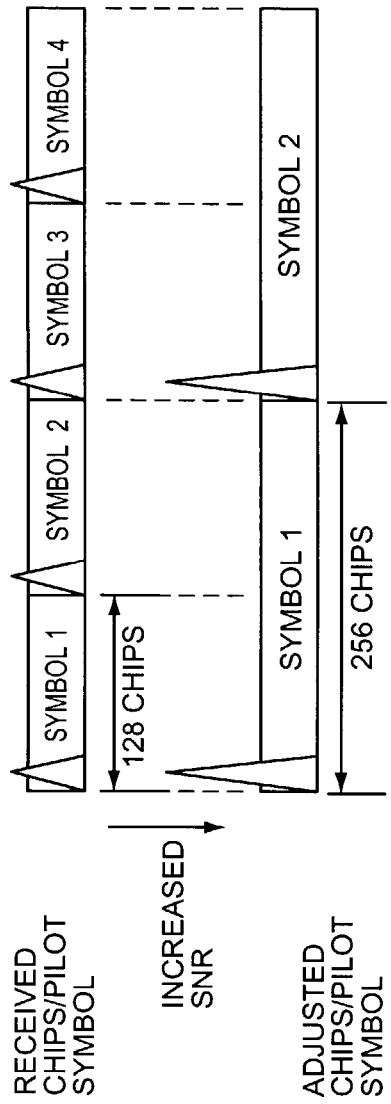
FIG. 8A is a diagram of exemplary signal compensation for a pilot or other known signal in support of FER inference.

FIG. 8A outlines a general approach to spreading gain adjustment, and details a technique wherein a greater number of pilot signal spreading chips are accumulated per pilot symbol. In effect, this extends the pilot symbol time and thus slows down the virtual data frame rate for the pilot signal. In turn, the decrease in the virtual data frame rate slows down pilot-based FER estimations, which slows down the rate at which the inner loop target can be adjusted for power control. Thus, the spreading gain approach may have practical limits depending upon the delays that can be tolerated in the outer-loop power control updates of the inner loop target.

Figure 8B:
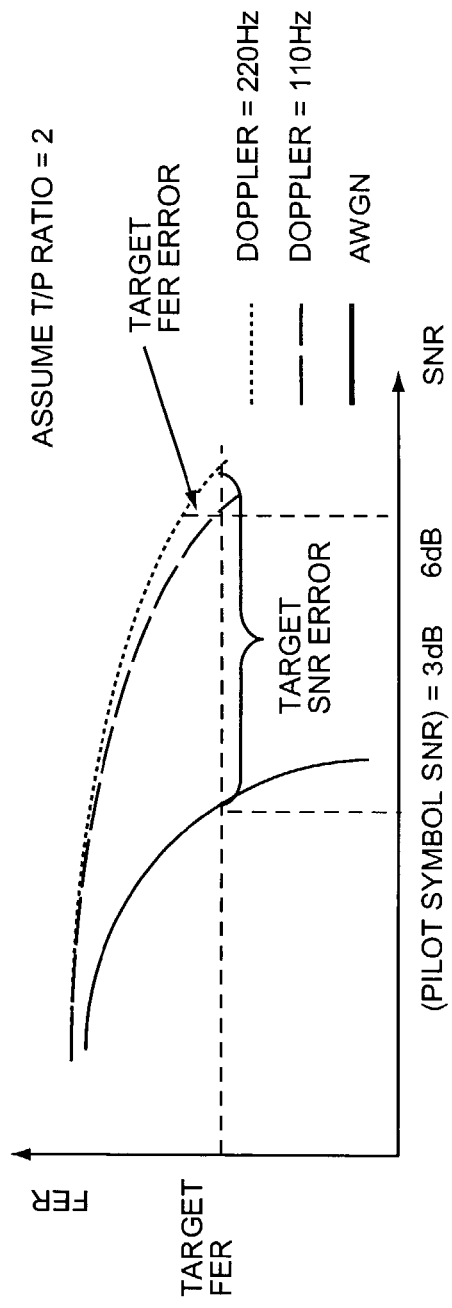
FIG. 8B is a graph of expected FER estimation performance in the context of FIG. 8A.

FIG. 8B illustrates expected performance for a given spreading gain adjustment scenario. The diagram assumes a transmit power ratio (T/P ratio) of two, i.e., the discontinuous channel is transmitted at twice the power of the pilot channel. As illustrated, pilot-based FER estimation approximates FER estimation based directly on the discontinuous channel, although spreading gain adjustment increases the observed Doppler effect as well as the effective SNR for the pilot signal. However, within reasonable levels of Doppler effect, such increases do not generate significant error in estimated FER.

FIG. 9 illustrates an alternative approach to pilot symbol compensation wherein the received pilot symbols are scaled by the T/P ratio, and then combined with corresponding noise estimates for the discontinuous channel. As illustrated, the T/P ratio is used to scale the pilot symbols to obtain scaled pilot symbols which may be thought of as representing traffic symbols as would have been received through the discontinuous channel at the higher received signal level associated with that channel's higher transmit power.

The approach further involves generating corresponding noise estimates for the scaled pilot symbols, and the scaled symbols plus the noise estimates are then passed through decoder 54 as virtual data frames to obtain the decoded data used for FER estimation. Note that the symbol scaling approach operates such that the pilot symbols are scaled before adding in the noise estimates to avoid scaling the noise by the T/P ratio.

Figure 10A:
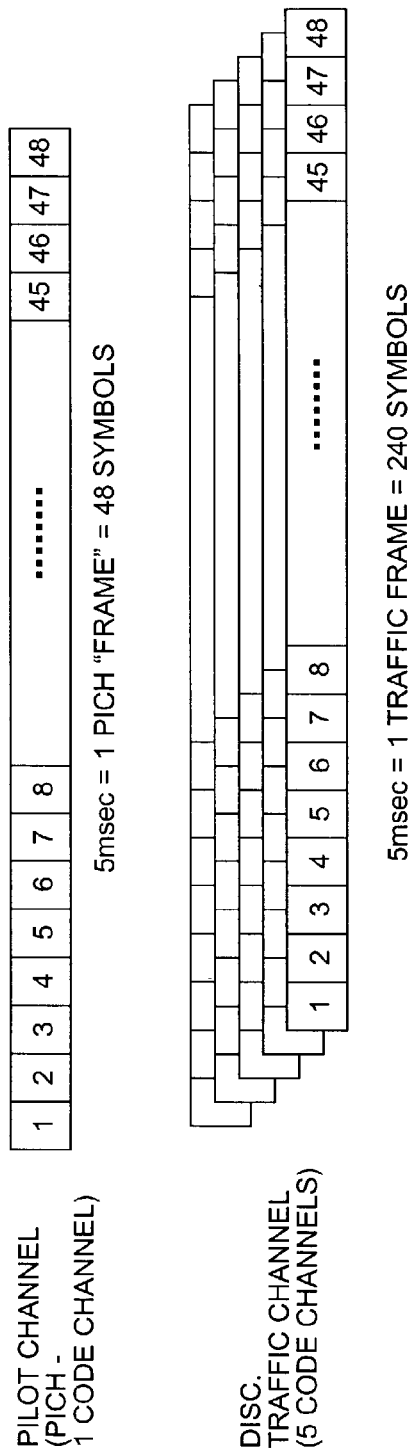
FIG. 10A is diagram of an exemplary short-frame approximation in support of FER inference.

FIG. 10A illustrates the potentially significant frame length differences that might exist between the pilot channel and the discontinuous channel, particularly where the discontinuous channel is a multicoded traffic channel. Such significant differences in frame length favor the use of the symbol scaling approach rather than the spreading gain adjustment approach, as that latter approach would require extending pilot symbol times to such an extent that FER estimates might be obtained too slowly for effective outer-loop power control.

However, even where FER estimation is based on a shorter frame length than that used for the channel of interest, one or more types of frame length compensation may still be used. For example, if the pilot signal includes 48 bits of information per pilot frame and an actual data frame on the channel of interest comprises 240 bits, then FER may be expressed as, $$FER=1-\text{Prob(Correct Frame)},$$

which may be expressed as, $$FER_{48}=1-(1-BER)^{48},$$

where BER=Bit Error Rate. In turn, BER may be expressed as, $$BER = 1 - \sqrt[48]{1 - FER_{48}},$$

and, therefore, the long-frame adjusted FER may be expressed as $$FER_{240}=1-(1-BER)^{240}.$$

Thus, according to the above equations, the FER computed using a shorter number of bits or symbols per frame that is actually used on the channel of interest may be compensated to yield a better approximation of the longer frame length signal associated with the channel of interest. In other words, the FER obtained using short-framed approximation may be compensated to more closely approximate the FER that would be expected for a longer frame length.

Figure 10B:
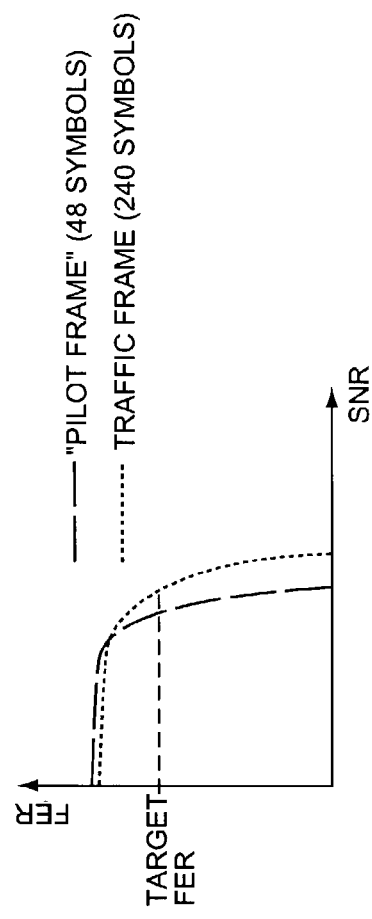
FIG. 10B is a graph of expected FER estimation performance in the context of FIG. 10A.

FIG. 10B illustrates the expected discrepancy between pilot-estimated FER and the FER estimates that would have been obtained based on the discontinuous channel for a five millisecond reception window. That is, FIG. 10B illustrates the effect of short-frame approximation. For the framing differences illustrated, one pilot channel "frame" comprises 48 pilot symbols, while one discontinuous channel multicode frame comprises 240 symbols (five code channels, 48 symbols per code channel). As the graph shows, the pilot-based FER estimate does not significantly differ from what would have been obtained from the discontinuous channel.

Figure 11:
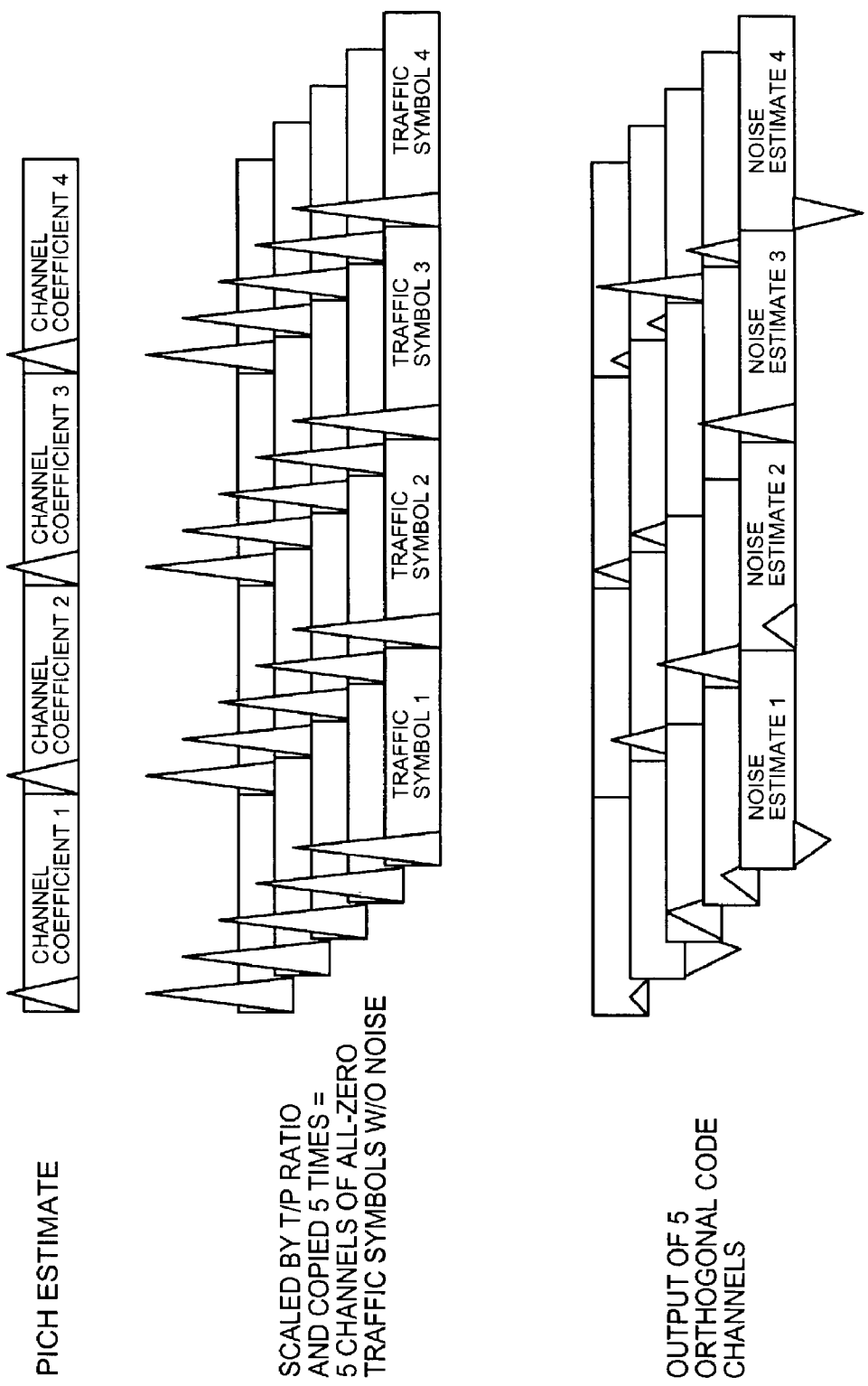
FIG. 11 is a diagram of exemplary long-frame approximation in support of FER inference.

FIG. 11 illustrates an alternative to the above short-frame approximation. Here, the pilot symbols are scaled by the T/P ratio and copied by the number of multicodes used on the discontinuous channel to create a set of symbols corresponding to the multicoded symbols of the discontinuous channel. In conjunction with this operation, the transceiver 40 generates corresponding noise estimates for each set of scaled pilot symbols. Thus, with the illustrated matched frame approach, pilot-based FER estimation is based on the same number of symbols per frame, as would be FER estimation based on the discontinuous channel.

Figure 12:
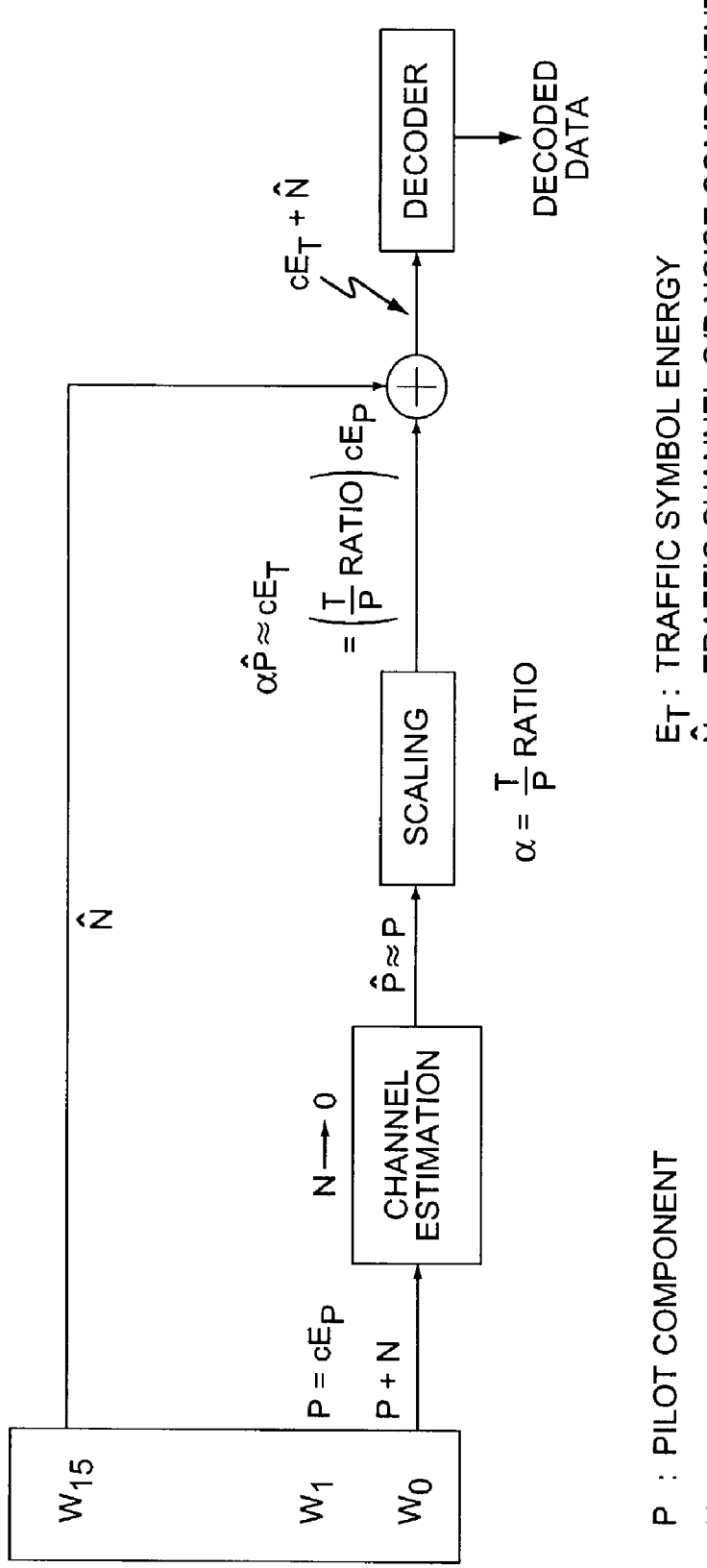
FIG. 12 is a diagram of functional operations associated with known signal scaling in support of FER inference.

Regardless of whether short frame approximation or matched frame techniques are used, the above symbol scaling approach adds, as noted above, estimated noise to the scaled pilot symbols before decoding to obtain more accurate FER estimation. However, as noted, the technique adds those noise estimates after symbol scaling to avoid scaling the estimated noise. FIG. 12 is an exemplary function diagram for coordinated noise estimation, symbol scaling, and combined symbol-plus-noise decoding as might be practiced in transceiver 40. As the diagram illustrates functional operations, those skilled in the art should understand that the various functions might be implemented in hardware, software, or some combination thereof. As such, several elements of transceiver 40 might be used, including demodulator 52, decoder 54, FER estimator 56, and baseband processor 46.

Regardless of the implementation details, the received pilot signal is despread using its assigned Walsh code, which here is depicted as code $W_0$. The output from the Walsh despreading operation provides a pilot component P plus an orthogonal noise component N to a channel estimation function. Here, the pilot component P comprises pilot symbol energy $E_p$ multiplied by a propagation path coefficient c, i.e., a channel coefficient. The channel estimator removes orthogonal noise and its output is "normalized" to the pilot channel. Thus, the channel estimates $\hat{P}$ output by the channel estimator are the "pilot symbols" to be decoded for FER estimation.

The channel estimates $\hat{P}$ are compensated based on scaling them by the T/P ratio, which is known to transceiver 40. Thus, the outputs of the scaling operation are scaled channel coefficients multiplied by the pilot symbol energies, which is equivalent to the product of the channel coefficients and the traffic symbol energies.

A summing function combines these scaled pilot symbols with corresponding orthogonal noise estimates $\hat{N}$, which may be obtained based on the interference between the particular Walsh codes assigned to the discontinuous channel, or generally obtained using other Walsh codes. The combined scaled pilot symbols plus noise are then decoded as virtual data frames by the decoding function, and the resulted decoded data is evaluated to estimate the FER of the discontinuous channel.

Generally, one desires that the noise estimates made for the signal information received on the first channel have the same statistical properties as the noise associated with the channel of interest. The statistics of the noise-plus-interference, generally termed "noise" herein, for signals received on the channel of interest may be the same or similar to the noise on the first channel. That is, the noise on the first channel and the noise on the channel of interest may have similar long-term average and variance values.

However, in some instances, a symbol-by-symbol estimation of noise which would have been received on the channel of interest, had data been transmitted on that channel, requires use of channel-specific values. For example, in a CDMA system, if one wishes to reproduce the symbol-by-symbol realization of noise samples for the channel of interest for use with symbol information received on the associated first channel, the spreading code(s), e.g., Walsh codes, that would have been used for the channel of interest should be used for noise estimation.

Thus, in FIG. 12, one would use the Walsh code(s) associated with the channel of interest to make per-symbol noise estimates for combining with respective ones of the scaled pilot symbols received on the pilot channel. More generally, then, one uses statistically accurate noise estimates, that is, noise estimates that correspond to what would be expected for the channel of interest, such that the signal received on the first channel serves as a more accurate substitute for signal information on the channel of interest.

Generally, the statistical properties of noise on orthogonal channels on the forward or reverse links of CDMA systems is the same where those channels use the same PN scrambling code. Thus, the above discussion of using the unique or specifically assigned Walsh codes associated with the channel of interest may apply just to circumstances where a given Walsh code or codes are used for channelization without Pseudo Noise (PN) chip scrambling. In any case, those skilled in the art will recognize the noise estimation may be tailored to particular needs and circumstances.

Finally, as regards noise estimation, it should be noted that the above statistical considerations are satisfied in TDMA systems by coordinating noise estimation with the signal information received on the first channel. For example, where the channel of interest is discontinuous, the noise on that channel retains the same statistical properties over both active and inactive (discontinuous) periods. Thus, symbols received at given symbol times on the first channel may be combined, perhaps after scaling or some other manipulation, with noise estimates for the discontinuous channel made at corresponding times.

Although various processing details may differ depending on circumstances, the present invention provides a basis for accurately estimating the FER for a signal of interest received on one channel based on another signal received on an associated channel. Such inferential FER estimation may be appropriate where, for example, the signal of interest is received discontinuously such that there are intermittent periods where no data is received that can be used for direct FER estimation, or where the signal of interest is otherwise received at a duty cycle too low to support a desired rate of FER estimation.

In such circumstances, the present invention provides a basis for processing the signal received on another channel such that it serves as a substitute or surrogate for the channel of interest. That is, the received signal may be manipulated such that it approximates a signal received through the channel of interest and, as such, may be decoded as would be a signal actually received through the channel of interest. The results of such decoding then serve as a basis for inferring FER estimates for the channel of interest.

FER estimation for a given channel may be based on another channel's signal in accordance with the present invention during discontinuous portions of the given channel's signal. Then, when a signal is available on the channel of interest, FER estimation may be switched to a direct calculation using the actual signal received on the channel of interest. In some instances, FER estimations for a given channel of interest may alternate between inferred and direct FER estimation in accordance with the availability of signal information on the channel of interest.

Further, as noted in the above discussion, pilot-based FER estimation may be used at the network 10 for reverse link power control, and may be used at MS 12 for forward link power control. Generally, the forward link pilot signal from BS 20 is fixed as some percentage of the maximum forward link transmit power, but the MS 12 may not know the T/P ratio used by the BS on the forward link.

Thus, where the MS 12 practices the present invention for forward link power control during DTX periods on the forward link, MS 12 reconstructs data frames for the discontinuous channel using, for example, a forward link pilot signal it receives on an associated pilot channel. To accomplish such reconstruction, the MS 12 mimics BS power adjustment based on the last received power level of the discontinuous channel. That is, for forward link applications, the MS 12 must use the forward link power control commands it sends to the BS 20 to recreate the virtual data frames obtained from the signal serving as a substitute for the signal of interest.

In general, the received signal used as the basis of FER inference can be essentially any type of channel that is either continuous or provides a signal having a sufficiently high duty cycle. Additionally, the received signal should, in general, be known in advance, or comprise determinable data, such that the receiver processing the signal has a basis for identifying errors in data decoded from the received signal. Although the received signal is decoded as if it was received on the channel of interest, it need not convey any encoded data. For example, the received signal can be a pilot or synchronization signal that is treated as a virtually encoded signal, as explained in detail above.

Thus, the present invention is not limited to the exemplary details given above. It is, as noted, applicable to both TDMA and CDMA network types, and is adaptable to a wide range of signal types. As such, the present invention is limited not by the foregoing discussion and accompanying figures, but rather is limited only by the following claims and the reasonable equivalents thereof.

What is claimed is:

1. In a wireless communication network, a method of transmit power control for a channel of interest comprising:
   receiving a first signal comprising one or more received symbols on a first channel that is transmitted in association with the channel of interest;
   decoding the first signal as a virtually encoded data signal for the channel of interest;
   estimating a first frame error rate (FER) for the channel of interest based on the decoded first signal; and
   setting an inner loop power control target used for the channel of interest based on the estimated first FER.

2. The method of claim 1, wherein the channel of interest is a discontinuously transmitted (DTX) channel having active and inactive times, and wherein estimating a first frame error rate (FER) for the channel of interest based on the decoded first signal is performed during inactive times of the discontinuous channel.

3. The method of claim 2, further comprising estimating a second FER for the DTX channel based on data received via the DTX channel during active times of the DTX channel.

4. The method of claim 3, further comprising setting the inner loop power control target used for the channel of interest based on the estimated second FER.

5. The method of claim 1, wherein the first signal is a pilot signal, and wherein decoding the first signal as a virtually encoded data signal for the channel of interest comprises decoding the received symbols in the pilot signal as an all-zeros codeword.

6. The method of claim 1, wherein decoding the first signal as a virtually encoded data signal for the channel of interest comprises mapping the first signal into a code set associated with the channel of interest.

7. The method of claim 6, wherein mapping the first signal into a code set associated with the channel of interest comprises processing the first signal such that the received symbols in the first signal correspond to one or more defined code words in the code set associated with the channel of interest.

8. The method of claim 1, wherein the received symbols in the first signal comprise a known pattern, and wherein decoding the first signal as a virtually encoded data signal for the channel of interest comprises mapping the known pattern into one or more valid codewords in a code set associated with the channel of interest.

9. The method of claim 1, wherein the channel of interest is a discontinuous traffic channel, and wherein the first signal comprises a synchronization signal transmitted in association with the discontinuous traffic channel.

10. The method of claim 1, wherein the channel of interest is a discontinuous control channel, and wherein the first signal comprises a synchronization signal transmitted in association with the discontinuous control channel.

11. The method of claim 1, wherein the channel of interest is a discontinuous traffic channel, and wherein the first signal comprises a pilot signal transmitted in association with the discontinuous traffic channel.

12. The method of claim 1, wherein the channel of interest is a discontinuous control channel, and wherein the first signal comprises a pilot signal transmitted in association with the discontinuous control channel.

13. The method of claim 1, wherein the first signal is an encoded data signal, and wherein decoding the first signal as a virtually encoded data signal for the channel of interest comprises:
  decoding the first signal according to a decoding process associated with the first signal to identify the received symbols in the first signal;
  mapping the identified received symbols into codewords in a code set associated with the channel of interest; and
  decoding the codewords to obtain decoded data.

14. The method of claim 1, wherein decoding the first signal comprises decoding the received symbols in the first signal.

15. The method of claim 14, further comprising generating compensated received symbols based on one or more differences between the first channel and the channel of interest.

16. The method of claim 15, wherein decoding the first signal comprises decoding the compensated received symbols for estimation of the first FER.

17. The method of claim 15, wherein generating compensated received symbols comprises adjusting a spreading gain of the received symbols obtained from the first signal.

18. The method of claim 17, wherein adjusting a spreading gain of the received symbols comprises extending a symbol time of the received symbols.

19. The method of claim 15, wherein generating compensated received symbols comprises generating scaled received symbols by scaling the received symbols obtained from the first signal based on a transmit power ratio of the channel of interest to the first channel.

20. The method of claim 19, further comprising generating noise estimates for the channel of interest corresponding to the scaled received symbols, and decoding the scaled received symbols in combination with the corresponding noise estimates.

21. The method of claim 15, wherein the one or more differences include a frame length difference between the channel of interest and the first channel.

22. The method of claim 15, wherein the one or more differences include a transmit power difference between the channel of interest and the first channel.

23. The method of claim 15, wherein the compensated received symbols represent virtually encoded data frames, and wherein decoding the first signal comprises decoding the virtually encoded data frames.

24. The method of claim 1, wherein the channel of interest is a forward link channel transmitted by a network transmitter to a mobile station receiver, such that FER estimation for the channel of interest is performed at the mobile station, and setting the inner loop power control target affects outer loop power adjustment of the forward link channel transmitted by the network transmitter.

25. The method of claim 1, wherein the channel of interest is a reverse link channel transmitted by a mobile station to a network receiver, such that FER estimation for the channel of interest is performed at the network receiver, and setting the inner loop power control target affects outer loop power adjustment of the forward link channel transmitted by the mobile station.

26. A transceiver for use in a wireless communication system, the transceiver operative to estimate a frame error rate (FER) for a channel of interest received from a remote transmitter by:
  receiving a first signal transmitted from the remote transmitter on a first channel associated with the channel of interest;
  decoding the first signal as virtually encoded data for the channel of interest to obtain decoded data; and
  estimating the FER for the channel of interest based on detected errors in the decoded data.

27. The transceiver of claim 26, wherein the transceiver compensates the first signal for one or more differences between the first channel and the channel of interest.

28. The transceiver of claim 27, wherein the transceiver compensates the first signal for a frame length difference between the first channel and the channel of interest.

29. The transceiver of claim 27, wherein the transceiver compensates the first signal for a transmit power difference between the first channel and the channel of interest.

30. The transceiver of claim 29, wherein the transceiver compensates symbols received in the first signal by generating scaled symbols based on scaling the received symbols using a transmit power ratio between the first channel and the channel of interest.

31. The transceiver of claim 30, wherein the transceiver adds corresponding noise estimates for the channel of interest to the scaled received symbols.

32. The transceiver of claim 27, wherein the transceiver compensates the first signal by adjusting a spreading gain of the first signal.

33. The transceiver of claim 26, wherein the transceiver comprises a base station in the wireless communication network, and wherein the first channel and the channel of interest comprise reverse link channels associated with a mobile station operating as the remote transmitter.

34. The transceiver of claim 26, wherein the transceiver comprises a mobile station supported by the wireless communication network, and wherein the first channel and the channel of interest comprise forward link channels transmitted to the mobile station from a base station operating as the remote transmitter.

35. The transceiver of claim 26, wherein the transceiver decodes the first signal as virtually encoded data to obtain decoded data by mapping the first signal to a code set associated with the channel of interest to form a surrogate signal, decodes the surrogate signal using a decoding process associated with the channel of interest.

36. A method of estimating a Frame Error Rate (FER) for a channel of interest in a wireless communication network, the method comprising:
  receiving first signal information transmitted by a remote transmitter on a first channel;
  receiving second signal information transmitted by the remote transmitter on a second channel, wherein the second channel is the channel of interest;

decoding the first signal information as virtually encoded data for the second channel to obtain decoded data; and estimating the FER of the second channel using the decoded data obtained from the first signal information.

37. The method of claim 36, wherein decoding the first signal information comprises mapping received symbols in the first signal information into a code set used for decoding received symbols in the second signal information.

38. The method of claim 37, wherein the first signal information comprises a known symbol pattern, and wherein mapping received symbols in the first signal information into the code set comprises modifying the known symbol pattern as needed to conform to the code set.

39. The method of claim 37, wherein the first signal information comprises an encoded signal, and wherein mapping received symbols in the first signal information into the code set comprises:

decoding the first signal information using a decoding process associated with the first channel to obtain known data such that the received symbol values in the first signal information comprise known symbol values; and modifying the known symbol values as needed to conform to the code set.

40. The method of claim 37, wherein decoding the first signal information further comprises:

generating noise estimates corresponding to the received symbols in the first signal information;

combining the noise estimates with the received symbols in the first signal information to generate received symbol values; and decoding the received symbol values to obtain the decoded data.

41. The method of claim 40, wherein the network is a CDMA network and the second channel is associated with one or more assigned spreading codes, and wherein generating noise estimates corresponding to the received symbols in the first signal information comprises using the one or more assigned spreading codes to generate the noise estimates.

42. The method of claim 41, wherein using the one or more assigned spreading codes to generate the noise estimates comprises despreading the first signal information using the one or more assigned spreading codes associated with the second channel at corresponding symbol times of the first signal information to obtain a noise estimate for each corresponding symbol time.

43. The method of claim 37, wherein mapping received symbols in the first signal information into a code set used for decoding received symbols in the second signal information comprises manipulating the received symbols in the first signal information to conform to the code set.

44. The method of claim 36, wherein the first signal information is a pilot signal, and wherein decoding the first signal information as a substitute for the second signal information to obtain decoded data comprise decoding the pilot signal as a virtually encoded data signal.

45. The method of claim 44, wherein decoding the pilot signal as a virtually encoded data signal comprises:

passing the pilot signal through a decoding process used for the second signal information to obtain the decoded data; and evaluating the decoded data to determine if the decoded data conforms to the virtually encoded data signal assumed for the pilot signal.

* * * * *

UNITED STATES PATENT AND TRADEMARK OFFICE
CERTIFICATE OF CORRECTION

| | | |
|---|---|---|
| PATENT NO. | : 7,142,865 B2 | |
| APPLICATION NO. | : 10/161143 | |
| DATED | : November 28, 2006 | |
| INVENTOR(S) | : Tsai et al. | |

It is certified that error appears in the above-identified patent and that said Letters Patent is hereby corrected as shown below:

Title page, item [73]:
      The Assignee, "Telefonaktie Bolaget LM Ericsson (publ)", should be -- Telefonaktiebolaget LM Ericsson (publ) --.

Signed and Sealed this

Twenty-second Day of May, 2007

JON W. DUDAS
*Director of the United States Patent and Trademark Office*